US011290707B2

United States Patent
Berglund et al.

(10) Patent No.: US 11,290,707 B2
(45) Date of Patent: Mar. 29, 2022

(54) METHOD FOR CARRYING OUT A HEALTH CHECK OF CAMERAS AND A CAMERA SYSTEM

(71) Applicant: Axis AB, Lund (SE)

(72) Inventors: Bjorn Berglund, Lund (SE); Joacim Tullberg, Lund (SE)

(73) Assignee: Axis AB, Lund (SE)

( * ) Notice: Subject to any disclaimer, the term of this patent is extended or adjusted under 35 U.S.C. 154(b) by 17 days.

(21) Appl. No.: 16/720,987

(22) Filed: Dec. 19, 2019

(65) Prior Publication Data

US 2020/0204792 A1  Jun. 25, 2020

(30) Foreign Application Priority Data

Dec. 21, 2018  (EP) .................................... 18215518

(51) Int. Cl.
  *H04N 17/00*  (2006.01)
  *H04N 5/14*  (2006.01)
  *H04N 5/225*  (2006.01)
(52) U.S. Cl.
  CPC ........... *H04N 17/002* (2013.01); *H04N 5/144* (2013.01); *H04N 5/2258* (2013.01)
(58) Field of Classification Search
  CPC ..... H04N 17/002; H04N 5/144; H04N 5/2258
  USPC ........................................................ 348/187
  See application file for complete search history.

(56) References Cited

U.S. PATENT DOCUMENTS

| 9,726,486 B1 | 8/2017 | Lahr et al. |
| 2008/0192116 A1 | 8/2008 | Tamir et al. |
| 2014/0036084 A1* | 2/2014 | Lu .................... G02B 26/005 348/148 |
| 2015/0154452 A1 | 6/2015 | Bentley et al. |
| 2018/0184078 A1* | 6/2018 | Shivalingappa ........ B60R 1/00 |

FOREIGN PATENT DOCUMENTS

| EP | 2709350 A1 | 3/2014 |
| WO | 2007/065259 A1 | 6/2007 |
| WO | 2016/076841 A1 | 5/2016 |
| WO | 2017/046704 A1 | 3/2017 |
| WO | WO-2017046704 A1 * | 3/2017 ......... G06K 9/00718 |

OTHER PUBLICATIONS

Extended European Search Report dated Jul. 10, 2019 for the European Patent Application No. 18215518.4.

* cited by examiner

*Primary Examiner* — John W Miller
*Assistant Examiner* — Omer Khalid
(74) *Attorney, Agent, or Firm* — Volpe Koenig

(57) ABSTRACT

A method for carrying out a health check of at least two cameras comprising the steps of initiating a health check process and checking, in response to the initiating step, for motion events stored in a database storing motion events, for each of the two cameras. If the checking for motion events indicates that a motion event has been stored in the database for one of the at least two cameras, then the method further comprises the steps of selecting a motion event found when checking for motion events stored in the database and retrieving a video clip corresponding to the selected motion event, captured by the one of the at least two cameras. The method further comprises the step of displaying the retrieved video clip together with a corresponding camera identification for evaluation.

12 Claims, 2 Drawing Sheets

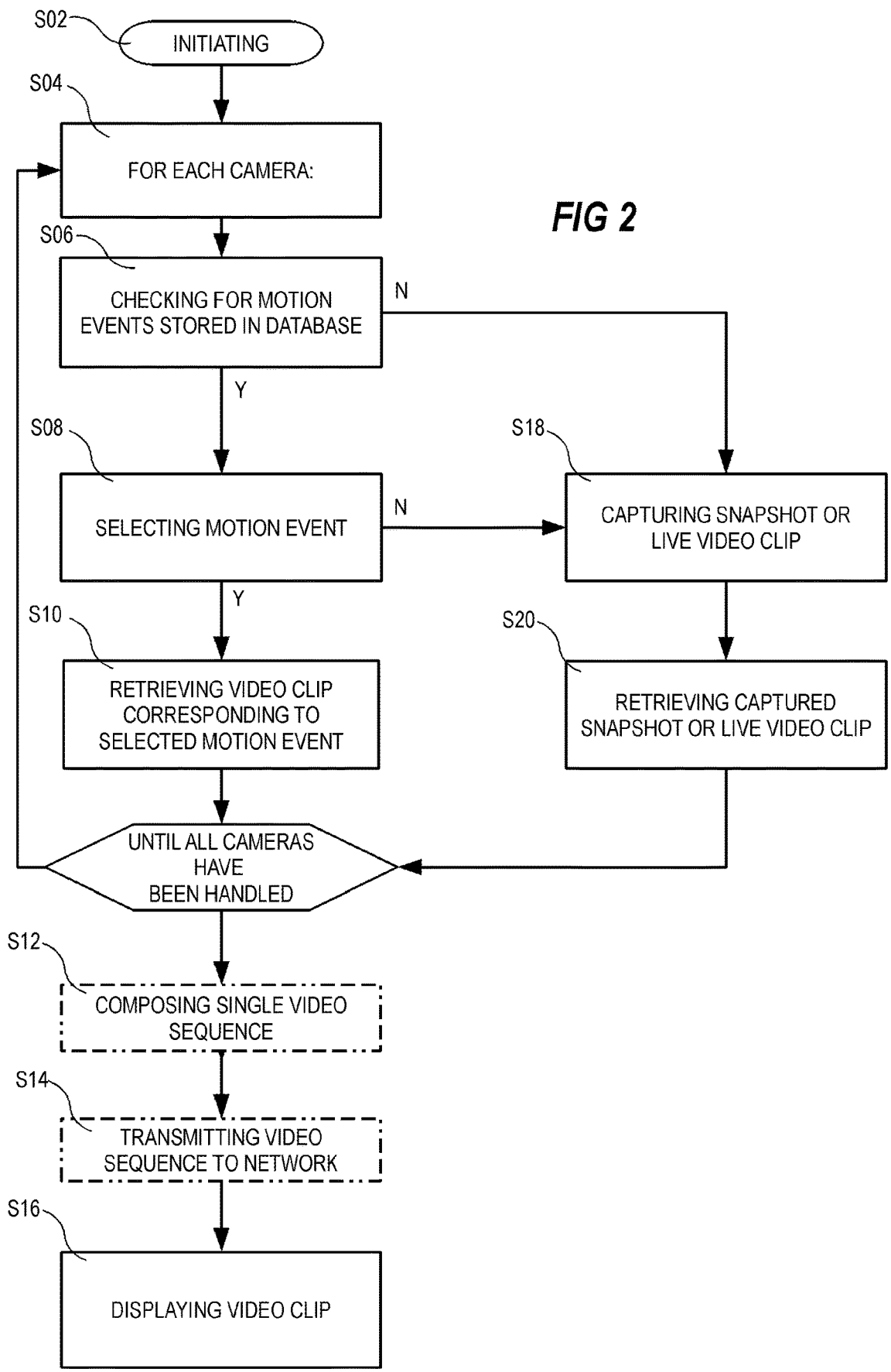

METHOD FOR CARRYING OUT A HEALTH CHECK OF CAMERAS AND A CAMERA SYSTEM

TECHNICAL FIELD

The present invention relates to a method for carrying out a health check of cameras in a camera system and to camera systems having an integrated health check procedure.

BACKGROUND

It is an important task to ensure that installed monitoring cameras are working according to specification. Many camera system owners have realised that a monitoring camera was not working correctly only after a stored video sequence of the camera was needed. The reasons for a camera not working correctly may be several, from tampering, where for instance someone has altered the direction of the camera, a faulty configuration of the camera and incorrect system parameters to mechanical or electrical fault of the hardware.

Conventional methods for checking the health of networked cameras commonly include an operator regularly logging on to each camera in a camera system to capture an image or a video clip of the current scene in the field of view of the camera. Using the captured image data, the operator visually verifies that the camera is capturing good quality images. The method is time consuming as each camera needs to be accessed. It is also prone to errors, for instance a camera may be missed, or the whole process forgotten.

In other currently available health check methods, camera malfunction is detected when a computed camera health measurement exceeds a malfunction threshold. The camera health measurement is computed based on a comparison of a current camera health record with a plurality of stored camera health records obtained in a learning mode, which characterize known states of normal camera operation. The camera health record may include image parameters, such as luminance and chrominance, or camera parameters, such as focus and exposure values. The method requires the definition and calculation of reliable measurements, which may be complex to define. Also, the method is time consuming as the collection of information during a learning mode is needed.

There is thus room for improvements.

SUMMARY

An improved health check of cameras is achieved, in full or at least in part, by a method and a camera system as defined by the appended independent claims.

According to a first aspect, a method for carrying out a health check of at least two cameras is provided. The method comprises the steps of:
initiating a health check process;
checking, in response to the initiating step, for motion events stored in a database storing motion events, for each of the at least to two cameras, if the checking for motion events indicates that a motion event has been stored in the database for one of the at least two cameras, then the method further comprises:
  selecting a motion event found when checking for motion events stored in the database;
  retrieving a video clip corresponding to the selected motion event, captured by the one of the at least two cameras and
  displaying the retrieved video clip together with a corresponding camera identification for evaluation.

The presented health check method displays video clips corresponding to selected motion events, making it possible to evaluate the quality of the captured image data, correctness of camera and image parameters, the functionality of generating a motion event and/or the encoding, recording and retrieving of a video clip related to that motion event. The display of the collected video clips enables evaluation of all these mentioned functionalities making the health check process reliable and efficient.

The previously captured video clip is already available; there is no need to spend time on accessing the cameras one by one to capture live image data. The presented health check process therefore takes less time than other known methods.

The previously captured video clip is retrieved as it corresponds to a selected motion event, and therefore contains motion. The motion content makes the video clip relevant and suitable for health check purposes. A health check process that instead captures what currently is present in the field of view of a camera could not ensure that motion is captured. The resulting video clip may include motion, or it may not, resulting in less reliable image data to evaluate.

To retrieve live video clips containing image data corresponding to motion, i.e. by visiting each camera one by one to capture live image data containing motion, would of course be very inefficient timewise, as a camera operator would have to wait until motion appears in the scene to capture the wanted video clip.

As the camera health check process displays a video clip containing motion, it can, when evaluating the displayed video clip, quickly be determined that the camera is able to capture, encode, store and retrieve motion video. If a displayed video clip does not show visible motion, this is a sign that the corresponding camera may have a health issue.

With motion in the retrieved video clip, camera health problems resulting in image quality issues or camera parameters issues are found faster or more reliably during the evaluation of the displayed video clip, than with images without motion. Issues with video encoding or compression causing images with motion to lose quality will also be apparent when evaluating a displayed video clip containing motion. This will be harder or even impossible to find in a video clip without motion. Hence by evaluating image data containing motion, camera health may be verified easily, fast and reliably.

The suggested method for carrying out a health check of a camera system displays relevant image data that enables advanced, informed and efficient evaluation using simple means.

A health check is generally a check to validate that a device is suitable for performing the function for which it is designed. Specifically, a health check of a camera may include validating that camera parameters and image parameters are set so that the captured image streams have the intended quality.

A motion event is an event indicating that motion was detected. Specifically, a motion event indicates motion detected in the field of view of a camera, and is information generated by a motion detection unit.

A video clip is generally a short image sequence, comprising two or more image frames which may be a selected part of a longer recording. In this description herein a video clip is meant to be interpreted as a video clip previously captured by a camera, or it may be a live video clip, or a snapshot captured live.

A video sequence is generally a series of video clips put together to form a unit. Specifically, a video sequence may be a collection of retrieved video clips captured by cameras in a camera system, corresponding to selected motion events.

In the selecting step, the selection of the motion event may be based on a point of time of registration or occurrence of the motion event or based on that the motion event was stored, registered or occurred after a point of time of a latest previous health check. By selecting motion events based on point of time of storage, registration or occurrence provides a possibility to retrieve the latest relevant image data for display. In this manner, the evaluation of the displayed image data may be made on the most recently stored information available. Selecting motion events that occurred after the last previous health check results in that health issues affecting the camera system after this point in time will be included in the evaluation, while selecting older motion events may lead to that incorrect camera health is determined as later issues affecting the camera will not be evaluated. Alternatively basing the motion event selection on storage, registration or occurrence at another selected point of time, other than the most recent, may provide the opportunity to determine a camera health status at that particular point of time.

In some embodiments, in response to the checking step indicating that no motion event has been stored in the database after a point in time of a latest previous health check, for one of the at least two cameras, a snap shot or a live video clip may be captured with that camera as a video clip, the video clip captured with that camera may be retrieved and the retrieved video clip, may be displayed, together with a corresponding camera identification, for evaluation. To ensure that image data, in the form of a video clip, may be made available for all cameras in the camera system, also for those cameras where no motion event was stored and/or for those cameras where no motion event was selected, a snap shot or a live video clip may be captured live. The live capture will reflect the current field of view of the camera at the time, which may or may not include motion, even so, it may be an advantage that the method displays image data from all cameras in the camera system.

The method may comprise a further step of composing a single video sequence including the retrieved video clips of the at least two cameras, together with the corresponding camera identification and wherein the step of displaying the retrieved video clip together with the corresponding camera identification is carried out by displaying the video sequence. In this way the retrieved image data may be transmitted to the display, and displayed, as a package in the form of a single video sequence, enabling a time efficient evaluation by an operator.

The method for carrying out a health check of at least two cameras may further comprise a step of transmitting the composed video sequence to a communication network or making the composed video sequence available over the communication network. An advantage with transmitting the composed video sequence, comprising the retrieved video clips, over the communication network is that the image data may be made available for display on a display remote from the camera location.

In some embodiments the stored motion event may be generated by one of the cameras as a result of motion having been detected. When the camera is generating the motion event the suggested health check method will include a check also of the motion detect event generation functionality of the camera.

Each video clip may be of a predetermined length of time. The length of time may range between 1 second to 10 seconds. By limiting a video clip to a predetermined length of time, preferably reflecting the evaluation time needed for an operator to evaluate the camera health by viewing a video clip containing motion, the evaluation process and thereby the camera health process may be made efficiently. By specifying a range for the predetermined length of time for a video clip, the camera health process may be adapted to the operator's experience, to the operator's working situation as well as to the general quality of a retrieved video clip.

According to a second aspect, a camera system having an integrated health check is provided, where the camera system comprises:

at least two cameras connected to a communications network;

a database storing motion events from the at least two cameras;

a checker configured to checking motion events stored in the database;

a selector configured to select a motion event for each of the at least two cameras from the database, if a motion event has been stored in the database for that camera;

a retriever configured to retrieve a video clip originating from at least one of the at least two cameras, where the video clip corresponds to the selected motion event;

a display presenting the retrieved video clip together with a corresponding camera identification to enabling carrying out the health check.

The retriever may be arranged to retrieve a snap shot or a live video clip captured by one of the at least two cameras, as a retrieved video clip, if no motion event has been stored or selected for that camera.

The camera system may further comprise a composing unit composing the retrieved video clip and corresponding camera identification into a single video sequence and wherein the display is further arranged to display the single video sequence to enabling carrying out the health check.

The camera system may further comprise a transmitter configured to forward the composed video sequence to the communication network and/or to make the composed video sequence available over the communication network.

The second aspect presents similar features as presented by the first aspect and, thus, the advantages of these features are also applicable to the corresponding features of the second aspect.

A further scope of applicability will become apparent from the detailed description given below. However, it should be understood that the detailed description and specific examples, while indicating certain embodiments, are given by way of illustration only, since various changes and modifications will become apparent to those skilled in the art from this detailed description. Hence, it is to be understood that the teachings herein are not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

The above, as well as additional features will be better understood through the following illustrative and non-limiting detailed description of embodiments with reference to the appended drawings, where the same reference numerals will be used for similar elements, wherein:

FIG. 2 is a flow chart of a method for carrying out a health check of at least two cameras.

DETAILED DESCRIPTION OF EMBODIMENTS

Figure 1:
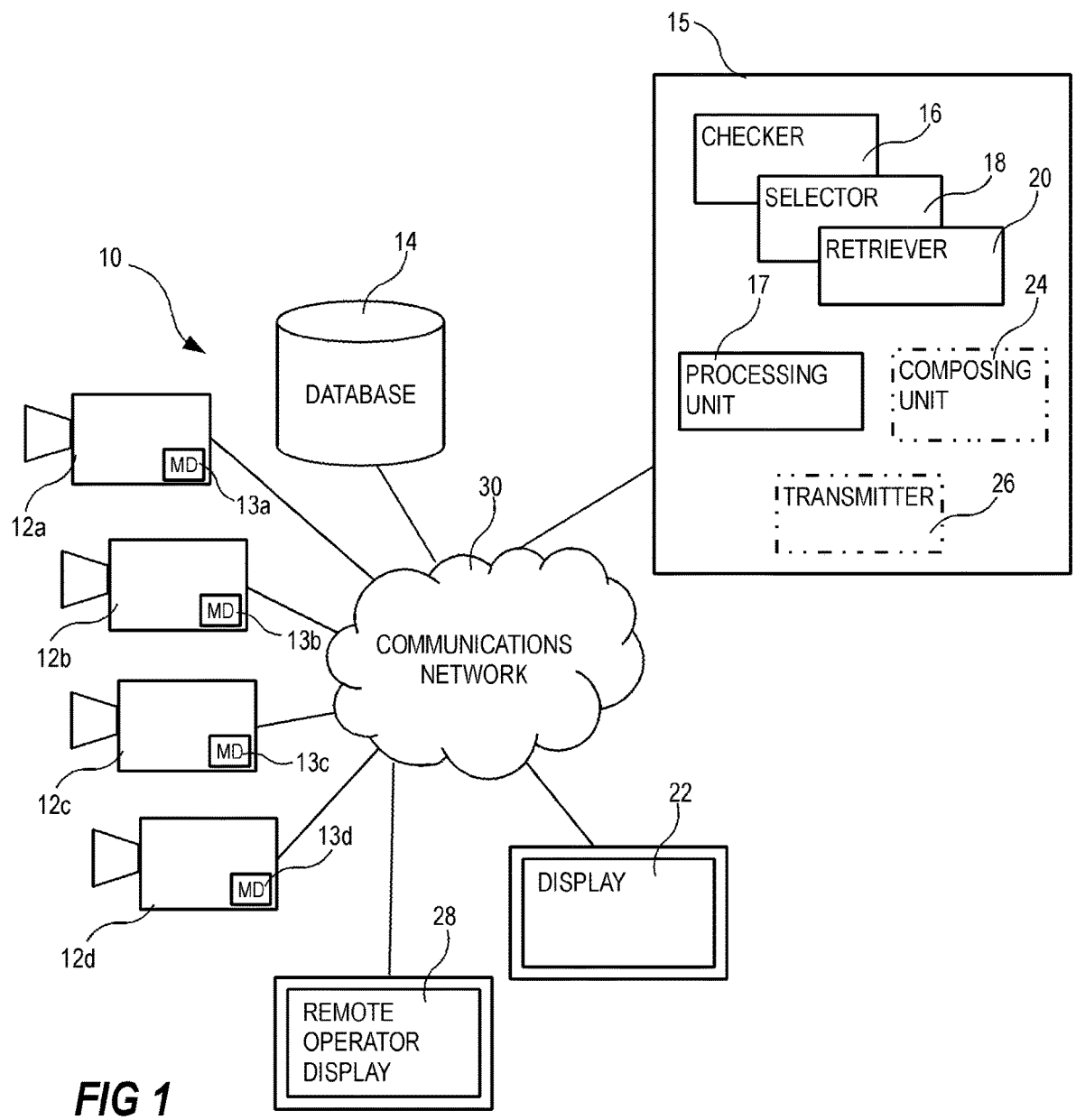
FIG. 1 schematically illustrates a camera system having an integrated health check.

The present teachings relate to checking the health of cameras and will now be described more fully hereinafter with reference to the accompanying drawings, in which embodiments are shown.

FIG. 1 illustrates a camera system 10 having an integrated health check. The camera system 10 comprises a plurality of networked cameras 12a-12d connected to a communications network 30 enabling the cameras 12a-12d to communicate with other devices within the camera system 10.

A networked camera 12a-12d is generally an image capturing device. Specifically, a camera may capture image sequences, i.e. video, and still images. A camera may be a monitoring camera, capturing digital or analogue video and it may be part of a camera system comprising two or more monitoring cameras.

The communications network 30 may for instance be a Local Area Network, a Wide Area Network, the Internet, a cellular network, wireless network, a WiFi-network, a cable-based network, an ethernet based network etc. or a combination of these. The communications network 30 provides connectivity between the devices within the camera system 10, both locally and, when needed, remotely.

The camera system 10 further comprises a database 14, a computing device 15 and a display 22, connected to the communications network 30. The computing device 15 comprises a checker 16, a selector 18, a retriever 20 and may optionally comprise a composing unit 24 and a transmitter 26. The units within the computing device may be implemented in a common computing device 15, as shown in FIG. 1, or some, or all, of the units may be implemented as separate units individually connected to the communications network 30.

Motion events related to cameras 12a-12d are created by, for instance, a motion detection process 13a-13d within a camera 12a-12d detecting motion by analysing an image stream as it is captured. These motion events are stored in a database 14, using methods well known in the art.

The computing device 15 may be implemented on a computing platform, e.g. personal computer, custom-built embedded system, a mobile device or by one or more of the cameras. Some or all of the functionality of the units 16-26 within the computing device 15 may be incorporated in a software application such as a Video Management System (VMS), a camera configuration tool, an installation tool, a monitoring tool or a separate health check application.

The checker 16 is arranged to check in the database 14 for one or more motion events each motion event related to any one of the plurality of cameras 12a-12d. When the checker finds a motion event related to one of the cameras, the selector 18 is arranged to select a motion event from this camera based on predefined selection criteria.

The retriever 20 is arranged to retrieve a video clip, corresponding to a motion event selected by the selector 18, i.e. each retrieved video clip corresponds to a selected motion event. The video clips may be retrieved from a storage arranged to store video clips. The video clips may be stored in the database 14 or in another storage configured for storing video clips.

The display 22 is arranged to present the retrieved video clip together with an identification of the corresponding camera. Where the selector 18 selects motion events related to more than one camera, the retriever 20 retrieves the corresponding video clips from these cameras. The presentation of the video clips on display 22 enables an operator to look at and to evaluate the image data.

Optionally, the camera system 10 may further comprise a composing unit 24 (indicated by the dashed-dotted box outlined in FIG. 1) arranged to compose the retrieved video clips, with their corresponding camera identification, into a single video sequence. If the checker 16 finds that more than one of the plurality of cameras have a related motion event stored in the database 14, each of the found motion events may be selected. This results in that video clips from more than one camera may be retrieved. The composing unit 24 may compose these video clips, and their corresponding camera identifications, into a single video sequence.

Optionally the camera system 10 may further comprise a transmitter 26 (indicated by the dashed-dotted box outlined in FIG. 1) connected to the communications network 30. The transmitter may be part of the computing device 15, or it may be a separate unit directly connected to the communications network 30. The transmitter 26 may make the composed video sequence available over the communications network 30, by transmitting the video sequence to the communications network 30. Alternatively, prior to transmitting, the transmitter 26 may format the composed video sequence into a format suitable for making it available over the communications network 30. The transmitter 26 may for instance be arranged to format and send the composed video sequence by email to a remotely located operator for evaluation of the image data, or to format and publish the composed video sequence on a web page available for authorized operator to access and display on a remote operator display 28.

A health check is generally a check to validate that a device is suitable for performing the function for which it is designed. Specifically, a health check of a network camera may include validating that camera parameters and image parameters are set so that the captured image streams have the intended quality.

The suggested camera health check method of at least two cameras specifically retrieves video clips containing motion from the cameras and display these. When evaluating these video clips, it may quickly be determined that the camera, from which a video clip originated, is capable of capture motion video. A camera health issue resulting in that a camera is only able to capture still images, would be clearly visible.

When evaluating displayed video clips containing motion, image quality issues such as motion blur, or camera parameters issues, such as colour or sharpening, may be found more easily and faster than with images without motion.

Issues with video encoding or compression will be easier to spot when evaluating retrieved image data containing motion, but harder or even impossible to find in video data not containing motion.

Hence by evaluating image data containing motion, the basic camera functionality may be verified, i.e. that the camera was switched on at the time of the selected motion event, and that the camera was able to provide an image at this point in time. In addition, the correctness of image parameters, camera parameters as well as video processing parameters used during video processing carried out on the captured image data may be verified reliably.

Now, referring to FIG. 2, the method for carrying out a health check of at least two networked cameras will be described.

In step S02 the health check process is initialized. This initialization may be by an operator action, such as giving a command in a software application, by an automatic initialization based on date and time, by a schedule, by an event, such as a report of a faulty camera, or by a special request for a health check. Typically, the health check may be carried out weekly or monthly. The initialization may be carried out by the owner of the system or by a system integrator having installed the camera system 10 and, who after the installation by agreement with the system owner, is responsible for that the cameras are working as intended. In both these cases, clearly a time efficient and reliable health check method for the cameras is desired.

As shown in FIG. 2, step S04 is the start of a loop where steps S06 to S10 are carried out for each camera 12a-12d, until all cameras have been handled.

In step S06, the checker 16 checks for at least one motion event stored in the database 14, related to the first camera 12a in the camera system.

A motion event is an event indicating that motion was detected. Specifically, a motion event indicates motion detected in the field of view of a camera, and is information generated by a motion detection unit. As is well known, a motion detection unit may be a process 13a-13d within the camera 12a-12d, detecting motion by analysing an image stream as it is captured. The motion detection units may be incorporated within each, or at least one, of the cameras 12a-12d. Alternatively a motion detection unit may be a motion detection analytics process analysing a stored image stream or it may be a separate device able to detect motion in the field of view of the camera, such as a Passive Infra-Red detector (PIR detector).

The motion event may be stored in a database as metadata annotated to the image data or on its own. Commonly it is stored with a reference to a corresponding stored video clip, or it may be stored together with the recorded video clip captured when the motion event was triggered.

Other types of events may be generated within a camera system, such as an event generated by noise captured by a microphone, internal or external to the camera, someone pressing a panic button, or image analytics within the camera, such as object classification or identification. These events do not necessarily result in recorded motion in the field of view of the camera and an evaluation of the corresponding video clips therefore lack some of the above-mentioned advantages.

The result of the check for motion events in step S06 comprises information about the presence, or no presence, of one or more motion events in the database 14, from the first of the cameras 12a. As already mentioned, motion events corresponding to a camera 12a-12d, may alternatively be generated by a unit external to a camera, i.e. by a PIR sensor detecting motion in an area corresponding to the field of view of a camera or by other means. These motion events are checked by the checker 16 in step S06 in the same way as motion events generated by a camera. If a motion event is found in S06 for the first camera 12a, the process continues to step S08.

In step S08, the selector 18 selects a motion event, found in step S06 for the first camera 12a, based on predefined selection criteria. The selection of motion events may be based on the point of time of registration of the motion event in the database or the point of time when the motion, which generated the motion event, occurred, when this data is available. Alternatively, the selection criteria may be as simple as selecting the latest created motion event found from the camera, or if more than one motion event from the camera is found, more than one motion event may be selected. Alternatively the selector 18 may select a motion event that occurred since the last health check was carried out, to ensure that the current health check is based on latest available information, or the last motion event that occurred during day time, if day time image quality is of particular interest, or the last motion event that occurred during night time, if night time image quality is of particular importance. The motion event may be selected based on type of camera, location or position of the camera. As an example, for a camera located indoors any motion event is selected and for a camera located outdoors only motion events occurred during daytime (or night time) are selected. Alternatively, the selection may be based on motion activity within the field of view of the camera, for instance a motion event is selected if the number of motion events are higher than a certain threshold during a certain period of time, e.g. daytime. This to ensure that the evaluation is carried out on relevant image data. The selection may be based on any combination of the above and may be different for different cameras. In some embodiments only one motion event is selected for each camera.

In step S10, the retriever 20 retrieves a video clip corresponding to a selected motion event. As mentioned above the retrieved video clip may be retrieved from a storage arranged to store video clips. Depending on the number of selected motion events, one video clip may be retrieved from each camera, or several. The retrieved video clip may be only a part of the stored video clip corresponding to a selected motion event, or the full stored video clip.

When step S10 is completed for the first camera 12a, the method loops back to step S04 to process the next camera in turn in the same way as has been described for the first camera 12a.

In this way all the cameras 12a-12d are handled in step S04-S10 resulting in that video clips corresponding to selected motion events are retrieved.

The order of steps S06, S08 and S10 may vary. Rather than handling one camera at a time, the check for motion events from all cameras 12a-12d may for instance be carried out before evaluating the result for each camera in step S06. The method may alternatively select motion events in step S08 for all cameras in the system before retrieving the corresponding video clips for each camera at a time in step S10.

Step S12 and step S14 in the process are optional, as indicated in FIG. 2 by the dashed-dotted box outlines and will be described later in the description.

In step S16 the retrieved video clips are displayed on a display 22, together with a corresponding camera identification identifying the camera that captured the video clip. The camera identification is typically stored together with the motion event or together with the retrieved video clip and may be retrieved when checking for motion events, when selecting a motion event or when retrieving the video clip.

The retrieved video clips may be displayed on display 22 all at the same time; alternatively the retrieved video clips may be displayed, on display 22, one at a time as they are being retrieved in step S10.

An operator may be tasked to view the displayed video clips and evaluate the image data with the aim to define a state of health for the corresponding camera, or the camera system as a whole. Camera health check systems, where stored image material is analysed automatically, and error reports are automatically created, may be complex, expensive in terms of processing power and in some cases unreliable. An evaluation involving human intelligence has therefore, in this situation, a value. The suggested method selects and collects relevant image data to display for a recipient, typically an operator, enabling an informed and efficient decision to be taken whilst evaluating the displayed image data.

The selection in the selecting step S08, by the selector 18, may be based on the point of time of registration of the motion event in the database or the point of time when the motion, which generated the motion event, occurred, when this data is available.

For instance, the selection of a motion event may be based on that the motion event was stored, registered or occurred after a point of time of a latest previous health check. This implies that the checker 16, or any other suitable unit in the camera system 10, stores the point of time of all, or at least the latest, previous health check. An alternative may be to select all motion events after a requested point of time. In another embodiment all motion events within a certain requested or predefined time period are selected. Clearly the most common case would be to evaluate the health of the camera system based on as new image data as possible. If no motion event has been registered for one of the cameras since the latest previous health check, it may be better to collect other image data from this camera, rather than using video clips representing older motion events, to ensure up to data information.

If in step S06 no motion event is found for the currently handled camera 12a-12d, or if in step S08, no motion event is found that fits the predefined selection criteria, the process may continue to step S18 and step S20, which will be described here below.

In step S18 the camera, where no motion event was found or selected, captures a snap shot or a live video clip. The snap shot or the live video clip may be taken at the point of time when the health check process is handling the camera in step S06 or S08 as shown in the flow chart in FIG. 2. Alternatively, the snap shot or the live video clip may be taken at another point of time during the health check process, for instance when the retrieval of video clips corresponding to all selected motion events is completed.

In step S20 the captured snap shot or the live video clip is retrieved from the capturing camera, or from a storage storing snap shots and live video clips from that camera, by the retriever 20. The captured snapshot or the live video clip is referred to as the retrieved video clip for the capturing camera.

As mentioned above, snap shots or live video clips may be retrieved in step S20 in connection with their capture. Alternatively, all cameras 12a-12d are first handled in step S06 and S08, or S18, and when all cameras have been handled, the video clips are retrieved in step S10 or step S20. In S20 retrieved video clips, the snap shot or the live video clip, do not necessarily contain motion, something that needs to be taken into consideration when evaluating the retrieved video clips.

In another scenario, the method includes step S12, an optional step as indicated by the dashed-dotted box outlined in FIG. 2, where the composing unit 24 composes the retrieved video clips, together with the corresponding camera identification for the camera from which the video clip originated, into a single video sequence. In the following step S16 the retrieved video clips and their corresponding camera identifications are displayed by displaying the video sequence composed in step S12.

In yet another scenario, the method includes step S14, another optional step also indicated by the dashed-dotted box outlined in FIG. 2, where the transmitter 26 transmits the composed video sequence to the communications network 30. Before the transmitter 26 transmits the composed video sequence to the communications network 30, it may additionally format the composed video sequence into a suitable format, both for the transmission step S14 as well as for the displaying step S16. The transmitter 26 may for instance be arranged to format and send the composed video sequence by email to a remotely located operator or to arrange the video sequence in a format suitable for publishing on a web page, available for an authorized operator to access.

In step S16 the video sequence transmitted to the communications network 30 by the transmitter 26, may be displayed on display 22 or on remote operator display 28, in the case where the transmitter transmits the composed video sequence to a part of the communications network 30 remotely to the network local to the cameras 12a-12d. The video sequence may for instance be displayed in step S16 by displaying an email containing the composed video sequence, or by displaying a web page where the composed video sequence is published, resulting in that a video clip contained within the video sequence, and its corresponding camera identification is displayed.

When the video clips are retrieved in steps S10 and S20 the full video clip may be retrieved, or only part of the video clip. A video clip corresponding to a motion event may comprise image frames both before and after the start time of the motion triggering the motion event, typically using pre-event buffering. The retriever 20 may be configured specifically to retrieve a video clip that includes frames containing the motion triggering the motion event.

To ensure that the health check process remains time efficient, the length of the retrieved video clips may be selected so that the total health check process is not too long. Preferably an operator should be able to conveniently look at the displayed video clips, e.g. as a video sequence containing all the retrieved video clips and their corresponding camera IDs, without stopping and replaying the display of the image data, and still be able to do the camera health evaluation. By limiting a retrieved video clip to a predetermined length of time, preferably reflecting the evaluation time needed for an operator to evaluate the camera health by viewing a video clip containing motion, the evaluation process and thereby the camera health process may be made efficiently.

Depending on the length of the stored or captured video clip, either the full video clip or part of it is retrieved. The predetermined length of time may be configurable and set depending on personal preference or experience of the operator evaluating the displayed video clips.

By specifying a range for the predetermined length of time for a video clip, the camera health process may be adapted to the operator's experience, to the operator's working situation as well as to the general quality of a retrieved video clip. Typically, the predetermined length of time for a retrieved video clip may range between 1 second to 10 seconds.

The predetermined time may be set depending on type of camera or configured zoom level, where a video clip from a camera with a wide-angle lens, or a camera set to wide angle zoom, may be longer than the predetermined time of a retrieved video clip from a camera with a tele lens, or zoomed in camera lens. This based on that the scene captured by the wide angle may contain more details that need to be evaluated by the person evaluating the displayed video clips. Location and position of a camera may be used to define a suitable predetermined length of time for a retrieved video clip, as different field of view may result in more or less details in a captured image.

When a retrieved video clip is displayed S16 on display 22 or on remote operator display 28, the operator looking at the displayed video clips may assess the health of the camera from which the retrieved video clip originated, by evaluating the content of the video clip.

As the corresponding camera identification may be displayed together with the retrieved video clip, the operator may mark or tag the cameras that may need attention due to a health issue found and/or those that seem to be working as intended.

For each retrieved video clip corresponding to a selected motion event S10, an indication, for instance in the form of an overlay, may be created and added to the video clip, typically by the retriever 20 or the composing unit 24, informing the operator that the video clip is retrieved as it corresponds to a selected motion event. The indication may in addition provide information regarding the frame rate. If the operator does not find any motion in the video clip during the evaluation, the corresponding camera may be tagged by the operator as needing attention.

In addition, or alternatively, for a video clip retrieved following the capture of a snap shot or a live video clip S20, an indication, for instance in the form of an overlay, may be created, typically by the retriever 20 or the composing unit 24, informing the operator that the video clip does not correspond to a selected motion event. If the operator nevertheless finds motion in the retrieved video clip during the evaluation, the corresponding camera may be tagged by the operator as a candidate for attention. A reason may be that the motion event generation process is not working correctly for this specific camera, or the camera system, or that the wrong camera identification may have been displayed together with the video clip. A live video clip may of course contain motion, even if no stored motion event was selected for that camera.

Another alternative for a video clip retrieved following the capture of a snap shot or a live video clip S20 is that an indication, for instance in the form of an overlay, may be created and added to the video clip, for instance by the retriever 20 or the composing unit 24, informing the operator that the video clip is a live capture, and that it thereby does not necessarily contain motion.

Evaluating camera health using video clips containing motion ensures that cameras wrongly capturing only still images may be found. As discussed above, a video clip with a "corresponds to a motion event" indication but where no motion is seen, may typically be tagged by the operator as needing attention. Misconfigured cameras where motion results in artefacts in the image frames may also be detected and tagged by the operator as needing attention.

As the operator, who is monitoring the display 22/28 where the retrieved video clips are displayed, may concentrate on the motion in the images displayed, the evaluation is faster than if the operator looking at the display 22/28 were to evaluate the camera health based on still images. This as generally a person's view is drawn to the motion within moving images.

Without motion in the video clips retrieved for the health check and displayed for evaluation, it is hard for the operator to determine if a camera is "frozen", i.e. if a camera is only capturing snapshots or if it is incapable of capturing any updated image data. The health check process retrieves a video clip if the video clip corresponds to a selected motion event, resulting in that "frozen" cameras, where typically no motion event will be generated, or at least no image data containing motion will be captured, will be treated separately, for instance by capturing live image data in step S18.

In the case where in step S06 no motion event is present for a camera 12a-12d, or in step S08 where no motion event is selected, and a snapshot is captured by that camera 12a-12d in step S18, the resulting retrieved video clip in step S20, in the form of the snapshot, will naturally not contain any motion that may be assessed by the operator. This particular retrieved video clip, in the form of a snapshot, may be highlighted when displayed to bring to the attention of the operator that there is no motion to asses. Also, when a live video clip is captured in step S18, the operator needs to be made aware, as this live video clip may contain motion, or it may not. The operator needs to assess the camera health for the camera, from which the snapshot or the live video clip is taken, based on the image data available, so that a correct assessment of the health of that camera may be made.

The displaying step S16 may be implemented having a functionality where, when the operator takes the decision that the camera corresponding to the displayed video clip is healthy, an action, for instance a click on the space bar, may continue the process by displaying the next of the retrieved video clips and thereby indicate that the current camera is healthy. Another action, for instance a click on the displayed video clip, may tag the corresponding camera as in need of attention. During an evaluation session within the displaying step S16 operator may typically be able to view retrieved video clips from 100-300 cameras. For larger systems, different subsets of the cameras may need to be selected for the health check at a regular interval, for instance a subset per day. The cameras where motion events were generated last night may be selected first. Alternatively, the cameras within a subset may be randomly selected.

In an implementation of the presented health check process within the transportation sector, where for instance buses or trains run on a daily schedule, motion events are expected at least once a day. Here it may be possible to evaluate up to 1000 cameras within a short time period, as every displayed video clip is expected to contain clearly visible motion which for an experience operator should take 1-2 seconds to recognize and tag.

The health check process may be carried out in the background, meanwhile the cameras 12a-12d continue to monitor and record as normal.

After the evaluation of the displayed retrieved video clips collected during the health check process, a health check report may be created, by the same health check process. The report may detail when the check was carried out, what cameras were checked, and the steps carried out by the health check process. The report may for instance tell for which camera a motion event was found, for which camera a live video clip or a live snapshot was taken, what information the operator based the evaluation on, the result of the evaluation, i.e. the result of the human intelligence applied, and which camera may need attention and which camera not.

A system integrator, having signed a health check service agreement with a camera system owner, will with the presented health check process have a method to easily, quickly, correctly and regularly verify the health and optimal working of the cameras 12a-12d within the camera system 10. Important for the system integrator is to carry out the camera health check service regularly, but also to be able to show proof to the system owner that the service has been carried out. Proof may be in the form of a report created by the health check process upon completion of the evaluation by an operator, documenting the process as well as the result.

The invention claimed is:

1. A method for carrying out a health check of at least two cameras, the method comprising:
    initiating a health check of at least two cameras, wherein the health check validates that camera parameters and image parameters are configured for each camera such that captured video streams have an intended quality;
    checking, in response to the initiating, for motion events stored in a database storing motion events for each of the at least two cameras, wherein each motion event is data indicative of detected motion in a field of view of a camera and a point of time of occurrence of the event indicating the detected motion; and
    in response to the checking for motion events indicating that a motion event has been stored in the database for each of the at least two cameras:
        selecting one motion event, for each of the at least two cameras, found when checking for motion events stored in the database;
        retrieving a single video clip of a predetermined length of time corresponding to each of the selected motion events captured by the at least two cameras;
        composing a single video sequence including the retrieved video clips of the at least two cameras and a corresponding camera identification; and
        displaying the composed video sequence to a user for evaluation and performance of the health check of the at least two cameras, wherein the retrieved video clips are displayed sequentially with the corresponding camera identification.

2. The method according to claim 1, wherein the selecting further comprises selecting the motion event based on a point of time of occurrence of the motion event.

3. The method according to claim 1, wherein the selecting further comprises selecting the motion event based on that the motion event was stored, registered or occurred after a point of time of a latest previous health check.

4. The method according to claim 1, wherein in response to that the checking indicating that no motion event has been stored in the database after a point in time of a latest previous health check, for one of the at least two cameras:
    capturing a snap shot or a live video clip with that camera as a video clip;
    retrieving the video clip captured with that camera; and
    displaying the retrieved video clip captured with that camera together with a corresponding camera identification for evaluation.

5. The method according to claim 1, further comprising transmitting the composed video sequence to a communication network or making the composed video sequence available over the communication network.

6. The method according to claim 1, wherein the stored motion event is generated by one of the cameras as a result of motion having been detected.

7. The method according to claim 1, wherein the predetermined length of time of each video clip ranges between 1 second to 10 seconds.

8. A camera system having an integrated health check, the camera system comprising:
    at least two cameras connected to a communications network;
    a database storing motion events from the at least two cameras;
    a checker configured to checking motion events stored in the database;
    a selector configured to select one motion event, for each of the at least two cameras from the database, in response to a motion event being stored in the database for the cameras, wherein each motion event is data indicative of detected motion in a field of view of a camera and a point of time of occurrence of the event indicating the detected motion;
    a retriever configured to retrieve a single video clip of a predetermined length of time corresponding to each of the selected motion events captured by the at least two cameras;
    a composing unit configured to compose the retrieved video clips and corresponding camera identification into a single video sequence; and
    a display configured to display the composed video sequence to a user for evaluation and performance of the health check of the at least two cameras, wherein the display is further configured to display the retrieved video clips sequentially with the corresponding camera identification, wherein the health check validates that camera parameters and image parameters are configured for each camera such that captured video streams have an intended quality.

9. The camera system according to claim 8, wherein the retriever is further configured to retrieve a snap shot or a live video clip captured by one of the at least two cameras, as a retrieved video clip, if no motion event has been stored or selected for that camera.

10. The camera system according to claim 8, further comprising:
    a transmitter configured to forward the composed video sequence to the communication network and/or to make the composed video sequence available over the communication network.

11. The method according to claim 1, wherein the predetermined length of time is configurable by the user.

12. The camera system according to claim 8, wherein the predetermined length of time is configurable by the user.

* * * * *